July 10, 1951 — R. D. BEATTY — 2,560,206
INDUSTRIAL TRUCK AND BUNKER
Filed Dec. 27, 1948 — 2 Sheets-Sheet 1

R. D. Beatty
INVENTOR
BY C. A. Snow & Co.
ATTORNEYS.

July 10, 1951  R. D. BEATTY  2,560,206
INDUSTRIAL TRUCK AND BUNKER
Filed Dec. 27, 1948  2 Sheets-Sheet 2
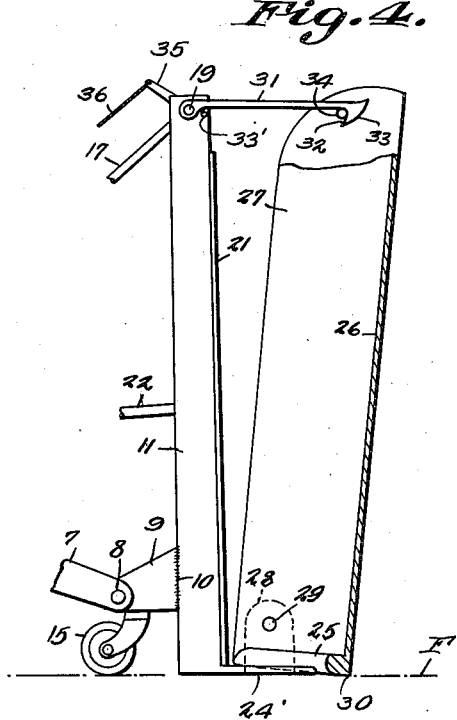
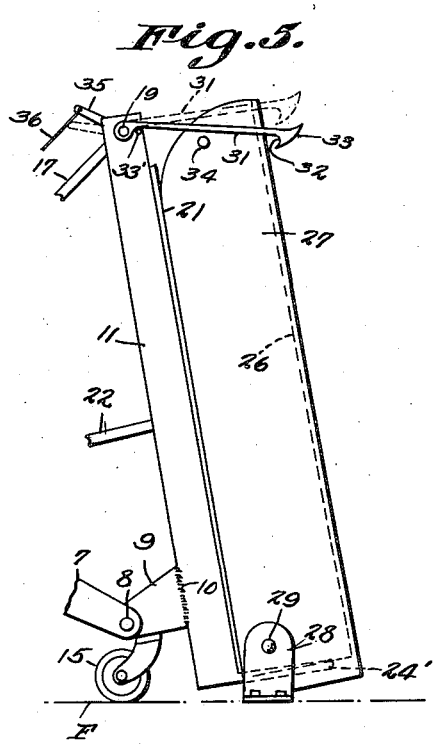
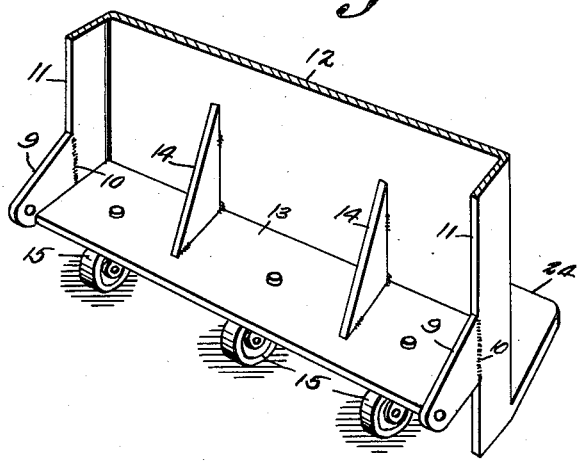
R. D. Beatty
INVENTOR
BY *CA Snow & Co.*
ATTORNEYS.

Patented July 10, 1951

2,560,206

UNITED STATES PATENT OFFICE 2,560,206

INDUSTRIAL TRUCK AND BUNKER

Robert D. Beatty, Birmingham, Ala.

Application December 27, 1948, Serial No. 67,378

4 Claims. (Cl. 214—82)

This invention relates to an industrial truck, and a storage bunker, said truck and bunker being novelly formed and arranged for mutual coaction for transfer of a load from the bunker to said truck.

Industrial trucks have widespread applications in the movement of materials in warehousing, shipping, or unloading operations. Yet, fully effective use of these trucks has not always been possible, due to peculiar characteristics as to size, shape and weight of a load of materials to be transported by the truck. For example, it has been difficult to utilize said trucks with full effectiveness in the lifting and transportation, by the trucks, of such materials as bagged lime or cement. It is common practice to store said bags in bunkers, one upon the other, so that where a number of superposed bags are engaged, and removed from their support, the load will buckle at its center, and otherwise present difficulties in handling.

To this end, I propose to provide a mutually coacting industrial truck and bunker, with said truck and bunker being novelly formed in a manner to allow the handling of materials such as those specified above, without possibility of the load assumed by the truck buckling or falling therefrom. To this end, I provide an industrial truck having a tiltable load carrying means, and a bunker or load support that is also tiltable, with said means and support adapted for interengagement for joint tilting, thus to transfer the load from the bunker to the truck without difficulty.

Another important object is to provide an industrial truck that in and of itself presents improvements over other trucks as commonly constructed, in that the load weight is not borne by the wheel-supported power unit which is a part of said truck, but rather, is positioned well in advance of said unit, and is supported upon its own wheels.

Another important object is to provide a means for interengaging the bunker and truck which permits ready connection of both structures for joint movement, and which permits disengagement with equal facility.

With the foregoing and other objects in view which will appear as the description proceeds, the invention consists of certain novel details of construction and combinations of parts, hereinafter more fully described and pointed out in the claims, it being understood that changes may be made in the construction and arrangement of parts without departing from the spirit of the invention as claimed.

Referring to the drawings

Figure 4 is a fragmentary view, partly in side elevation and partly in section, showing the truck and bunker interengaged.

Figure 5 is a similar view showing the position of the parts after joint movement thereof.

Figure 6 is a fragmentary rear perspective view of the lower end of the tiltable load carrying means of the truck.

Figure 1:
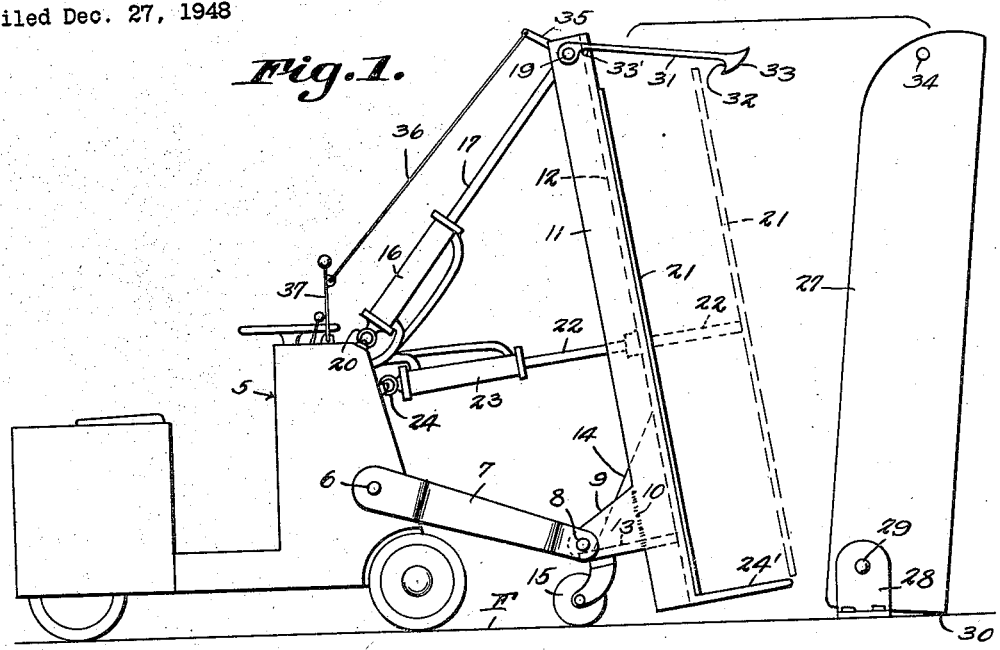
Figure 1 is a side elevational view of a truck and bunker constructed in accordance with the invention.

Referring to the drawings in detail, 5 designates generally an industrial truck to which are pivotally connected, at 6, the rear ends of forwardly diverging arms 7. The front ends of the arms are pivotally connected at 8 to the free ends of plate-like extensions 9 that are rigidly secured, as by welds 10, to longitudinal flanges 11 integral with and rearwardly extended from the back plate 12.

A bottom flange 13 extends rearwardly from the back plate 12, adjacent the lower end of the back plate and is rigidly secured thereto, as by gussets 14 or the like. Depending from the bottom flange 13 are transversely spaced casters 15. The parts so far described constitute a load-carrying means, tiltable on the pivots 8, and supported well in advance of the power unit 5, with said load-carrying means rolling upon its own wheels 15 so that the weight of said means and any load carried thereby is not shouldered by any part of the power unit.

As a means for tilting the load support 12, I provide the cylinder 16 from which extends the ram or piston rod 17 having at its free end the collar 18 through which extends the cross bar 19, said cross bar 19 and collar 18 being relatively rotatable. The cylinder 16 is pivotally mounted at 20 upon the power unit or truck 5.

Ram 17 is hydraulically operated under the control of the truck operator. Extension of the ram tilts the load rack 12 forwardly, and retraction of the ram tilts said load rack rearwardly.

I mount upon the load rack 12 the pusher plate 21 connected to the front end of a ram or piston rod 22, operating in cylinder 23 that is pivotally connected to the power unit at 24. Normally the pusher plate is in the full line position illustrated in Fig. 1. However, the hydraulic means 22, 23, under the control of the truck operator permit extension of the pusher plate to the position, for example, shown in dotted lines in Fig. 1.

Figure 2:
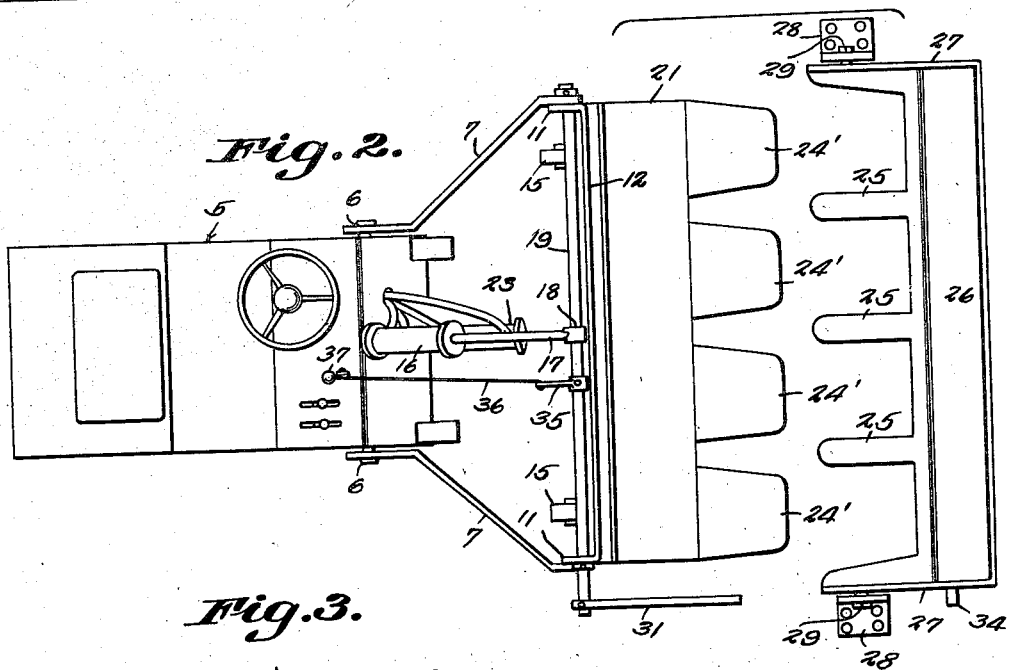
Figure 2 is a top plan view.

The load rack is further formed with the spaced forks 24' extended forwardly from the lower end of said rack. I prefer that the forks 24' be substantially wide and tapered forwardly as best illustrated in Fig. 2.

On forward movement of the truck 5, forks 24' are adapted to be respectively entered into the spaces between forks 25 extending from, and integral with, the lower end of a bunker including the rear wall 26 having rigid therewith the forwardly extended side walls 27. Said bunker is tiltably supported upon the brackets 28, that are anchored to a concrete floor F or similar supporting surface, said bunker pivoting upon the trunnions 29. Normally, the bunker is in the position illustrated in Figs. 1 and 4, the pivot point 29 being so located that the bunker is overbalanced to the rear so as to be supported upon the lower end of the rear wall 26 as shown at 30.

I provide a means for interengaging the tiltable load rack and bunker, for joint tilting thereof. To this end, one form of interengaging means is illustrated in Figs. 1, 2, 4, and 5. This comprises a swinging latch 31 rigidly secured at one end to one end of the cross bar 19, and formed at its other end with an inturned hook 32 the outer surface of which is inclined to provide a cam surface 33. A small lug 33' extended laterally from the load rack below the latch 31 holds it extended forwardly in a position where, upon forward movement of the truck 5, the cam surface 33 will slide over a stud 34 that extends laterally from one side wall 27 of the bunker, so as to cause said stud to be engaged by the hook 32 as illustrated in Fig. 4. Meanwhile, the forward movement of the truck 5 has caused the forks 24' to enter into the spaces between the forks 25, and it will be understood that there will be supported upon said forks 25 of the bunker a tiered series of filled bags or other objects, not shown, so that said forks 24' of the load rack will move under the load.

Also secured rigidly to the cross bar 19 is a crank arm 35, to which is pivotally connected one end of an operating rod 36, pivotally connected at its other end to the operating handle 37 which is positioned on the power unit 5 where it can be readily controlled by the truck operator.

Assuming that the parts are engaged as in Fig. 4, the truck operator operates the tilting control 16, 17, to tilt the loading rack rearwardly to a slight degree. This causes the bunker to be drawn toward the loading rack, and as soon as it passes over its pivot point 29, it swings freely toward the loading rack to the position illustrated in Fig. 5, in which position the superposed bags have all been deposited against the pusher plate 21 of said rack. The truck operator now elevates the latch 31 to the dotted line position illustrated in Fig. 5, using the operating handle 37 and means 35, 36, for this purpose, and backs the truck away from the bunker. The load is now transported to a desired location, and when it arrives at said location, can be pushed off by the pusher plate 21, which is moved forwardly to the dotted line position illustrated in Fig. 1 for this purpose. It will be understood that the pusher plate 21 will be normally retracted, although it can be extended even prior to tilting of the bunker, so as to engage the load supported in the bunker, before the bunker is even tilted.

Figure 3:
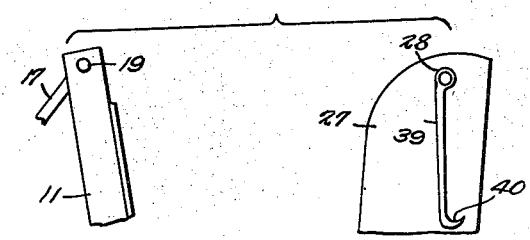
Figure 3 is a fragmentary side elevational view of the upper portions of the truck and bunker, showing a modified means for connecting the same.

In Fig. 3 I have illustrated a modified means for interengaging the load rack and bunker, the means illustrated in Fig. 3 not being under the control of the truck operator. A manually operable means is here shown, with stud 38 of the bunker having pivotally depending therefrom the latch 39 having the hook 40. Using the means illustrated in Fig. 3, the truck is brought to the position illustrated in Fig. 4, whereupon a helper swings the latch member 39 upon its pivot 38, so that the hook 40 engages the cross bar 19. The bunker is then tilted to the position illustrated in Fig. 5, in the manner previously described.

What is claimed is:

1. In an industrial truck a wheel-supported power unit, forwardly diverging arms pivotally connected at their rear ends to the power unit, a load rack pivotally connected near its lower end to the forward ends of the arms, a rollable mounting for the load rack, means extending from the power unit for tilting said load rack, a pusher plate mounted upon the load rack and adapted to provide a back rest for a load, and means extending from the power unit adapted for advancing and retracting said pusher plate.

2. In combination an industrial truck, a load rack tiltably mounted thereon, spaced forks extending from the lower end of the load rack, a tiltable bunker, spaced forks extending from the lower end of the bunker, the forks of the rack and bunker adapted to mesh, a pusher plate mounted upon the load rack, means for advancing and retracting the pusher plate toward and away from the bunker, and cooperating latch means adapted for releasably connecting the upper ends of the bunker and load rack, for tilting of the bunker with the rack.

3. In combination a wheeled body, a load rack tiltably mounted thereon, spaced forks extending from the lower end of the load rack, a tiltable bunker, spaced forks extending from the lower end of the bunker, the forks of the rack and bunker being adapted to mesh, a pusher plate mounted upon the load rack, means for advancing and retracting the pusher plate toward and away from the bunker, and cooperating latch members on the upper ends of the bunker and load rack respectively and adapted for releasable connection, for tilting of the bunker with the rack.

4. The combination of a wheeled truck body, a load rack tiltably mounted at its lower end thereon, for tilting of the upper end of the load rack toward and away from said body, a stationary base, a bunker tiltably mounted at its lower end upon said base for tilting of the upper end of the bunker, and latch connections on the upper ends of the load rack and bunker respectively, said latch connections releasably inter-engaging for tilting of the upper end of the bunker jointly with the upper end of the load rack, said base and bunker being normally free of connections to the load rack and truck body.

ROBERT D. BEATTY.

REFERENCES CITED

The following references are of record in the file of this patent:

UNITED STATES PATENTS

| Number | Name | Date |
|---|---|---|
| 1,024,701 | Rockwell | Apr. 30, 1912 |
| 1,215,718 | Salisbury | Feb. 13, 1917 |
| 1,275,849 | Cochran | Aug. 13, 1918 |
| 1,297,164 | Hickey et al. | Mar. 11, 1919 |
| 1,574,501 | O'Brien | Feb. 23, 1926 |
| 1,770,374 | Berg | July 15, 1930 |
| 1,807,128 | Munoz et al. | May 26, 1931 |
| 1,827,209 | Robbins | Oct. 13, 1931 |
| 1,934,289 | White | Nov. 7, 1933 |
| 2,030,925 | Lea | Feb. 18, 1936 |
| 2,182,005 | Stetson | Dec. 5, 1939 |
| 2,305,967 | Johnson | Dec. 22, 1942 |
| 2,409,302 | Millikin | Oct. 15, 1946 |
| 2,441,750 | Britton | May 18, 1948 |
| 2,452,258 | Nielsen | Oct. 26, 1948 |